United States Patent

[11] 3,588,524

[72] Inventor Gerhard Lerch
Weilheim, Germany
[21] Appl. No. 858,279
[22] Filed Sept. 16, 1969
[45] Patented June 28, 1971
[73] Assignee Drauss-Maffei Aktiengesellschaft
Munich, Germany
[32] Priority Sept. 20, 1968
[33] Germany
[31] P 17 88 034.1

[54] ELECTRONIC TIMER
14 Claims, 5 Drawing Figs.

[52] U.S. Cl. .......... 307/141, 307/293, 317/142
[51] Int. Cl. .......... H01h 7/00, H03k 17/26, H01h 47/18
[50] Field of Search .......... 307/141, 141.4; 317/142, 148.5 (TD); 307/293, (Inquired)

[56] References Cited
UNITED STATES PATENTS

| | | | |
|---|---|---|---|
| 3,376,429 | 4/1968 | Atkins et al. | 307/141 |
| 3,388,566 | 6/1968 | Kaper et al. | 307/141X |
| 3,393,604 | 7/1968 | Lundin | 317/142X |
| 3,408,539 | 10/1968 | Legg et al. | 317/142X |
| 3,469,116 | 9/1969 | Nomura | 307/293 |

OTHER REFERENCES

IBM TECHNICAL DISCLOSURE BULLETIN, " Timing Circuit" Vol. 6, No. 1, pp. 75, 76, June 1963, Copy In Class 307-293

*Primary Examiner*—William H. Beha, Jr.
*Attorney*—Karl Ross

ABSTRACT: An electronic timer has a normally conductive two-stage transistor amplifier energized via a constant-current transistor connected in series with the base-emitter circuit of the first amplifier stage. Through a condenser connected to the junction of a normally cutoff input transistor and an adjustable voltage divider, a blocking potential is momentarily impressed upon the base of this stage as the input transistor is rendered conductive by a trigger signal applied thereto. This reversal temporarily blocks the first amplifier stage whereas the second stage is maintained conductive until the first stage is again turned on as the condenser is recharged at a fixed rate through the constant-current transistor; the end of the off-period of the first state, whose duration depends on the setting of the voltage divider, causes the emission of an output signal by the cutoff of the second stage.

INVENTOR.
Gerhard Lerch
BY
Karl F. Ross
Attorney

Gerhard Lerch
INVENTOR.
BY Karl G. Ross
Attorney

ELECTRONIC TIMER

My present invention relates to an electronic timer particularly (but not exclusively) designed for the control of programmed machinery, e.g. injection-molding machines.

The general object of this invention is to provide a circuit arrangement which measures a desired time interval by purely electronic means, without intervention of electromagnetic relays, servomotors and other mechanical switching devices, so as to be capable of very precise timing as required for the generation of command signals to control high-speed machines.

An ancillary object is to provide a system of this character which is of simple design and can be realized with printed or integrated circuitry.

In accordance with this invention, I provide a preferably transistorized amplifier which advantageously is of the two-stage variety known as Schmitt trigger. A control electrode of this amplifier, such as the base of its first-stage transistor, is coupled by way of a timing condenser to a top on a resistive circuit which is connected across the DC source feeding the amplifier. Included in this resistive circuit is an electronic switch, such as an input transistor, which is reversible in response to a trigger signal to drive the aforementioned tap to a different potential with consequent change in the state of conductivity of the amplifier so as to establish an unstable condition; this unstable condition is terminated upon the charging of the condenser to a predetermined level by way of a constant-current device whereby the duration of the state of instability is exactly proportional to the potential change occurring upon the reversal of the electronic switch. The amplifier thereupon passes from its unstable condition to a stable one, which may be different from its original state of conductivity, and in so doing generates a command signal to actuate a switching device or some other load controlled by the system.

In order to facilitate the adjustment of the timing interval corresponding to the aforedescribed period of instability of the amplifier, the tap coupled to the amplifier input to the timing condenser is advantageously designed as the slider of a potentiometer connected in series with the electronic switch. For calibration purposes, this slider may be connectable to a voltmeter giving a reading of the voltage drop developed across one section of the potentiometer. A fixed compensating resistor, of a magnitude equaling the internal resistance of the voltmeter, is normally connected across the same potentiometer section in lieu of the voltmeter so that the switchover does not alter the overall circuit impedance. During such switchover to a calibrating position, it will be advantageous to unblock the normally blocked input transistor serving as the electronic switch, thereby establishing the unstable condition of the amplifier, and to block the amplifier in that condition whereby the reading of the voltmeter will not be disturbed by the transition to a stable state normally occurring at the end of the selected timing interval. For a coarser adjustment of this timing interval, e.g. by decadic magnitudes, several resistors may be selectively connectable in series with the constant-current device to modify the charging rate of the timing condenser.

The above and other features of my invention will be described in greater detail hereinafter with reference to the accompanying drawing in which.

Figure 1:
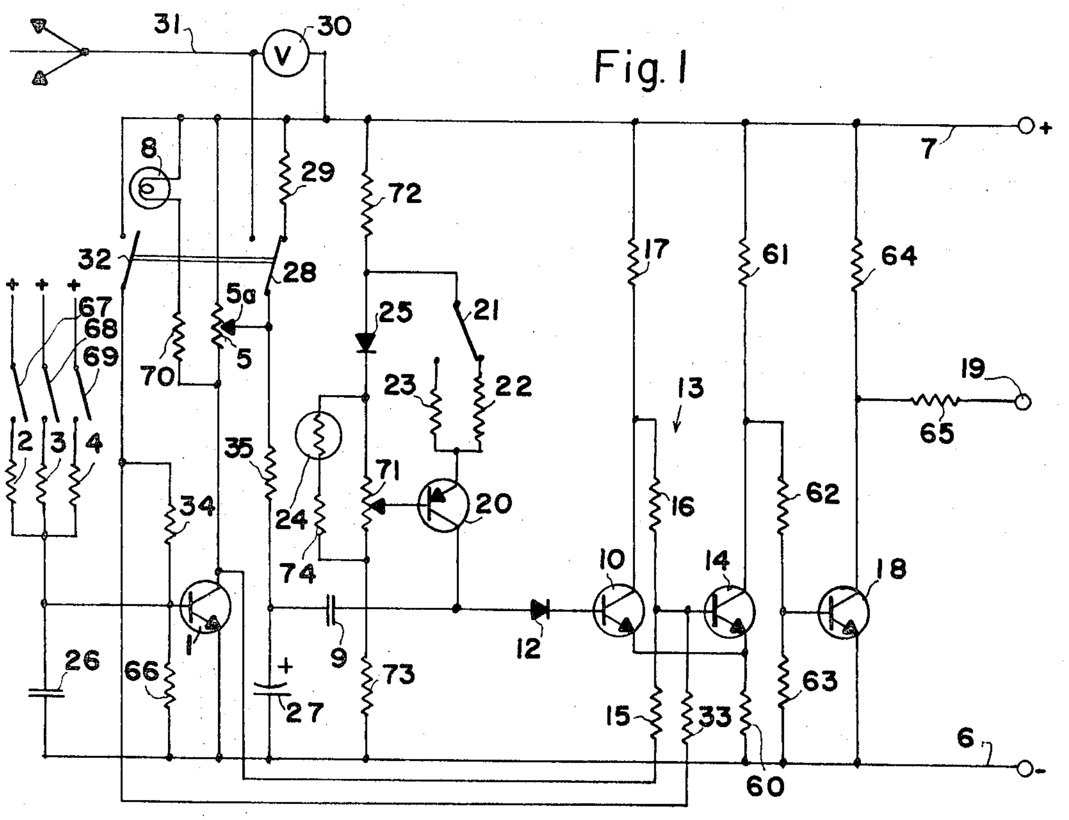
FIG. 1 is a circuit diagram of an electronic timer embodying the invention.

The system shown in FIG. 1 comprises a DC source represented by a negative bus bar 6 and a positive bus bar 7.

Connected across these bus bars is a potentiometer 5 in series with a normally blocked input transistor 1, shown to be of the NPN type, whose emitter is directly tied to the negative bus bar 6. The slider 5*a* of potentiometer 5 is connected through a resistor 35 to the left-hand terminal of a timing condenser 9, which may be of the conventional laminated type, having its right-hand terminal connected to the base of another NPN transistor 10 forming part of a two-stage amplifier 13. A diode 12 inserted between condenser 9 and transistor 10 is designed to protect this transistor against overvoltages upon the triggering of transistor 1 into conductivity.

Amplifier 13 includes a second transistor stage 14, also of the NPN type, having its base coupled to the collector of transistor stage 10 via a resistor 16. The emitters of both transistors 10 and 14 are connected to the negative bus bar 6 via a common resistor 60, their collectors being returned to positive bus bar 7 by respective resistors 17 and 61. An inverting transistor 18, likewise of the NPN type, has its base tied to the junction of two resistors 62, 63 connected between negative bus bar 6 and the collector of transistor 14; the emitter of transistor 18 is directly connected to negative potential whereas its collector is connected through a resistor 64 to positive potential and through a further resistor 65 to an output terminal 19.

Resistor 35 is normally connected, through a switch armature 28, to positive bus bar 7 by way of a further resistor 29. A voltmeter 30, whose internal resistance has a magnitude equaling that of resistor 29, is normally open circuited but can be connected across the upper section of potentiometer 5 (between its positive extremity and the tap 5*a*) by reversal of armature 28, cutting out the resistor 29. In this alternate or calibrating switch position, another armature 32 ganged with armature 28 applied positive voltage from bus bar 7 through a resistor 33 to the base of transistor 14 and through another resistor 34 to the base of transistor 1. A conductor 31 enables the selective connection of the voltage-measuring device 30 to other, similar timing systems for calibration purposes. A capacitance 27, advantageously designed as an electrolytic condenser, is connected between negative bus bar 6 (which may be grounded) and the junction of condenser 9 with resistor 35 for the suppression of background noise and transients.

Connected across the base and emitter of input transistor 1 are a condenser 26 and a resistor 66 in parallel therewith. A trigger signal, capable of saturating the transistor 1, can be applied to its base via any one of several resistors 2, 3, 4 upon closure of a corresponding switch 67, 68, 69. It will be understood that these switches, though illustrated for the sake of clarity as mechanical contacts, may also be of the electronic type. Condenser 26 may be designed as an electrolytic capacitor. A lamp 8 is connected, in series with a resistor 70, across potentiometer 5 to indicate the conductive state of transistor 1.

A transistor 20, here shown to be of the PNP type, serves as a constant-current device designed to charge the condenser 9 at a fixed rate. The base of this transistor is tied to the slider of a potentiometer 71 forming part of a voltage divider connected across bus bars 6 and 7, this voltage divider also including two fixed resistors 72, 73 in series with a diode 25. Potentiometer 71 is shunted by a thermal compensating circuit comprising a thermistor 24 in series with a resistor 74. The collector of transistor 20 is tied to the junction of condenser 9 with diode 12, its emitter being connectable to positive potential on bus bar 7 via resistor 72 in series with either of two calibrating resistors 22, 23 as determined by the position of a switch contact 21. A reversal of contact 21 changes the magnitude of the current passed by transistor 20, e.g. by one or several powers of 10, subject to a vernier adjustment of that magnitude by means of potentiometer 71. Naturally, there may be more than two such resistors selectively connectable in series with device 20.

In the normal or inactive state of the system shown in FIG. 1 (with switchover contacts 28 and 32 in their illustrated operating position), switches 67—69 are open, transistor 1 is cut off and the first-stage transistor 10 of amplifier 13 is saturated since condenser 9 is charged through a relatively high positive potential through transistor 20. The resulting voltage drop across the common emitter resistance 60 of amplifier 13, tending to cut off the second-stage transistor 14 thereof, is neutralized by positive potential from potentiometer 5 applied to the base of transistor 14 via resistor 33 so that this resistor is also in saturation. As a result, transistor 18 is substantially nonconductive whereby a high positive output voltage appears on terminal 19. The current flowing through transistor 20 during this phase passes through the base and emitter of transistor 10 to the negative terminal of the DC source.

Upon closure of any switch 67, 68 or 69, transistor 1 is turned on and sharply lowers the potential of slider 5*a* with consequent reduction in the base voltage of transistor 10 which thereupon ceases to conduct as the condenser 9 begins to recharge to its cut-in potential by way of constant-current device 20. The lowering of the collector potential of transistor 1 and the simultaneous raising of the collector voltage of transistor 10 substantially balance each other so as to leave unchanged, at this time, the saturated state of transistor 14.

After a predetermined measuring interval, dependent upon the setting of potentiometers 5 and 71 as well as the position of contact 21, transistor 10 cuts in and instantly deactivates the transistor 14 by driving its base negative with reference to its emitter. Transistor 18 thereupon saturates and sharply lowers the potential of output terminal 19 to generate the desired command signal. This stable state continues for an indefinite period, i.e. until the removal of positive voltage from the base of input transistor 1 by the opening of the previously closed switch or switches 67—69.

Figure 4:
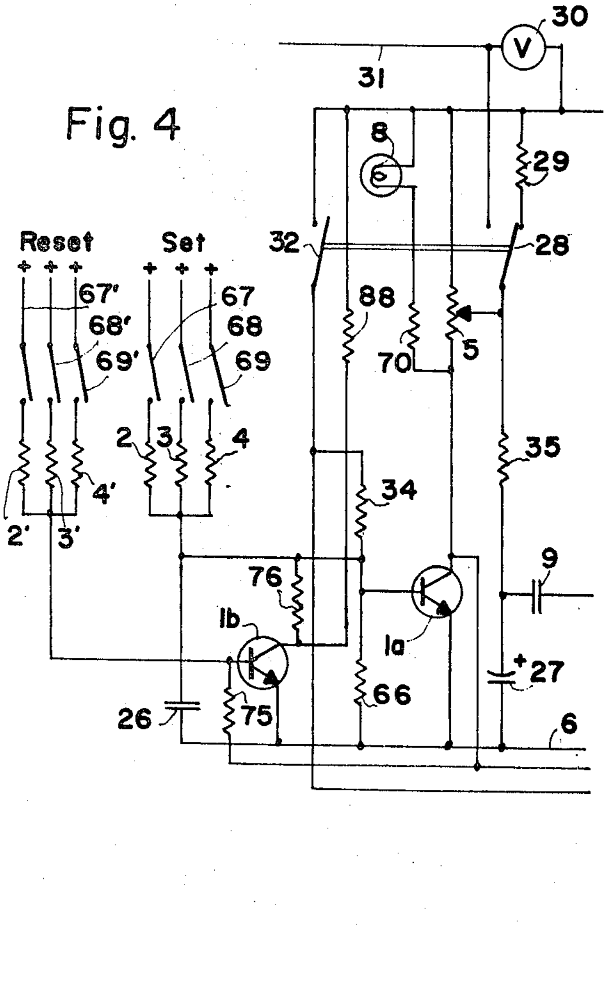
FIG. 4 is a fragmentary diagram illustrating a modification of the left-hand portion of the system of FIG. 1.
Figure 5:
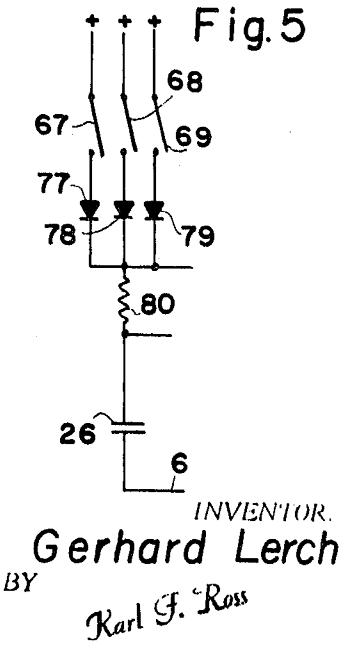
FIG. 5 shows a modified trigger circuit for the system of FIG. 1.

As illustrated in FIG. 4, transistor 1 of FIG. 1 may be replaced by a transistor 1*a* forming part of a bistable multivibrator of flip-flop which also includes a second NPN transistor 1*b* whose collector receives positive voltage through a resistor 88. The two transistors 1*a*, 1*b* are interconnected in the usual manner via coupling resistors 75, 76. Switches 67, 68 and 69, associated with input resistors 2, 3 and 4, control the base potential of multivibrator stage 1*a* to set the flip-flop, similar switches 67′, 68′, 69′ being operable to energize the base of multivibrator stage 1*b* via respective resistors 2′, 3′, 4′ to reset the flip-flop by cutting off the current flow through transistor 1*a*. In contradistinction to the arrangement of FIG. 1, where the trigger signal must be maintained throughout the measuring interval and for as long a period thereafter as the command signal is to remain in effect, the modified system of FIG. 4 can be triggered by a short pulse and restored by a similar pulse at a later time.

Where a large number of trigger circuits (e.g. 20 or more) are alternately closable to start the timer, the resistors 2, 3, 4 of FIG. 1 (or their counterparts in FIG. 4) can be replaced by respective diodes 77, 78, 79 etc. in series with the corresponding switches 67, 68, 69 etc. as illustrated in FIG. 5; a series resistor 80 is common to all these diodes.

Figure 2:
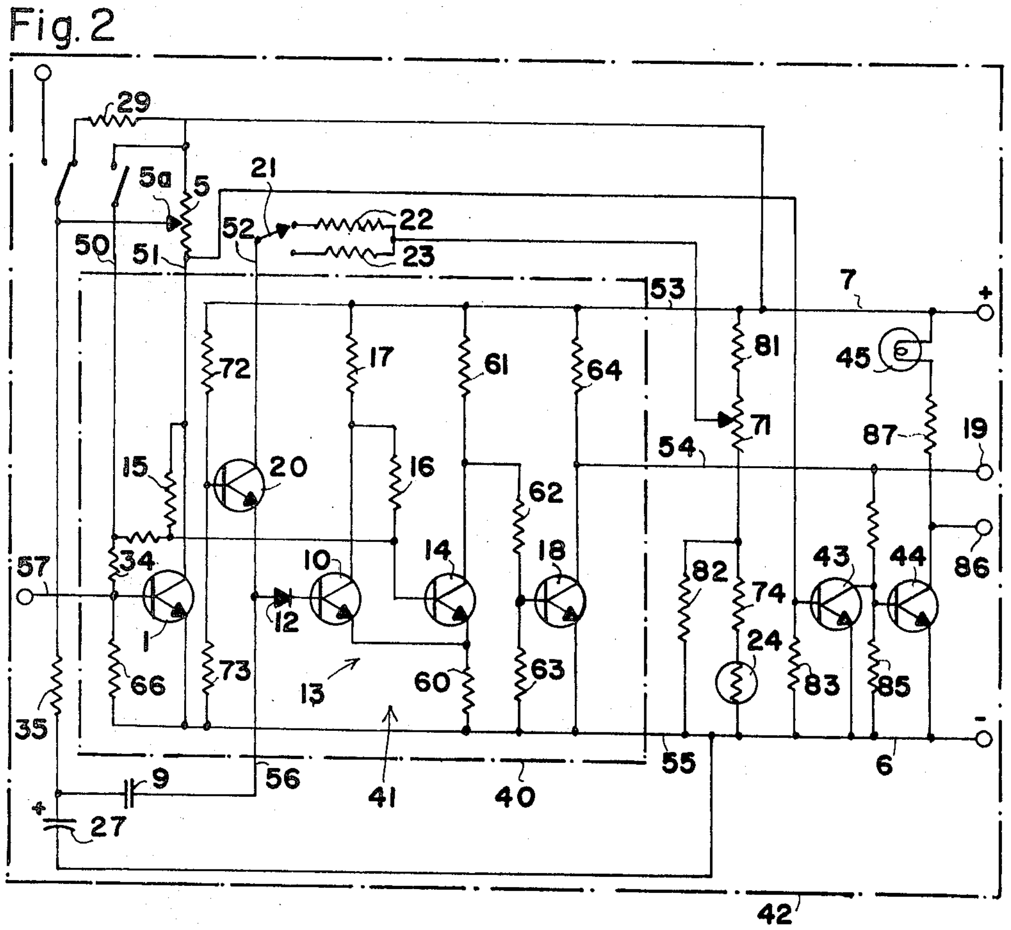
FIG. 2 is a diagram of the same basic circuit arrangement, illustrating the physical grouping of certain components in a module and on an associated mounting plate.

FIG. 2 shows a circuit arrangement, similar to that of FIG. 1, wherein the transistors 1, 10, 14, 18 and 20 and associated circuit elements of fixed magnitude form part of an integrated circuit in the form of a thin-film or laminated module 41 whose boundary is represented by a rectangular dot-dash line 40. The resistors associated with constant-current device 20 have been somewhat rearranged, the thermal compensating circuit 24, 74 being now in series with potentiometer 71 and another fixed resistor 81 and being shunted by a further fixed resistor 82. The potentiometer slider is connected to the collector of transistor 20 via contact 21 and one of the two (or more) calibrating resistors 22, 23. The external circuit elements, connected with module 41 through a set of leads 50—57, are arrayed on a mounting plate 42.

FIG. 2 also shows a further two-stage amplifier, comprising NPN transistors 43 and 44, connected in the output of inverting transistor 18 whose collector is tied directly to terminal 19 by way of lead 54. Transistor 43 has its base connected via lead 51 to the collector of transistor 1, this base being also returned to negative bus bar 6 through a resistor 83 while its emitter is directly connected to that bus bar. The collector of transistor 43 and the base of selector 44 are connected to the junction of two resistors 84, 85 spanning the bus bar 6 and the output lead 54. Another output terminal 86 is tied to the collector of transistor 44 from which a monitoring circuit, including a lamp 45 in series with a resistor 87, extends to bus bar 7.

Normally, i.e. with transistor 18 cut off, lead 54 carries the full positive potential of bus bar 7 so that transistor 43 saturates in response to the positive voltage applied to its base. The resulting voltage drop across resistor 84 is sufficient to render transistor 44 substantially nonconductive whereby lamp 45 is extinguished and terminal 86 carries a high positive potential. When transistor 1 saturates, lead 51 goes negative to cut off the transistor 43 while transistor 44 conducts and energizes the lamp 45, at the same time reducing the potential of terminal 86. At the end of the timing interval, transistor 18 breaks down and lowers the potential of lead 54 substantially to that of bus bar 6 whereby transistor 44 is again deactivated, despite the restoration of positive potential to the base of transistor 43. Lamp 45, therefore, lights only during the unbalanced phase of amplifier 13. An alternate command signal on terminal 86 is available to control a load during this timing interval.

Figure 3:
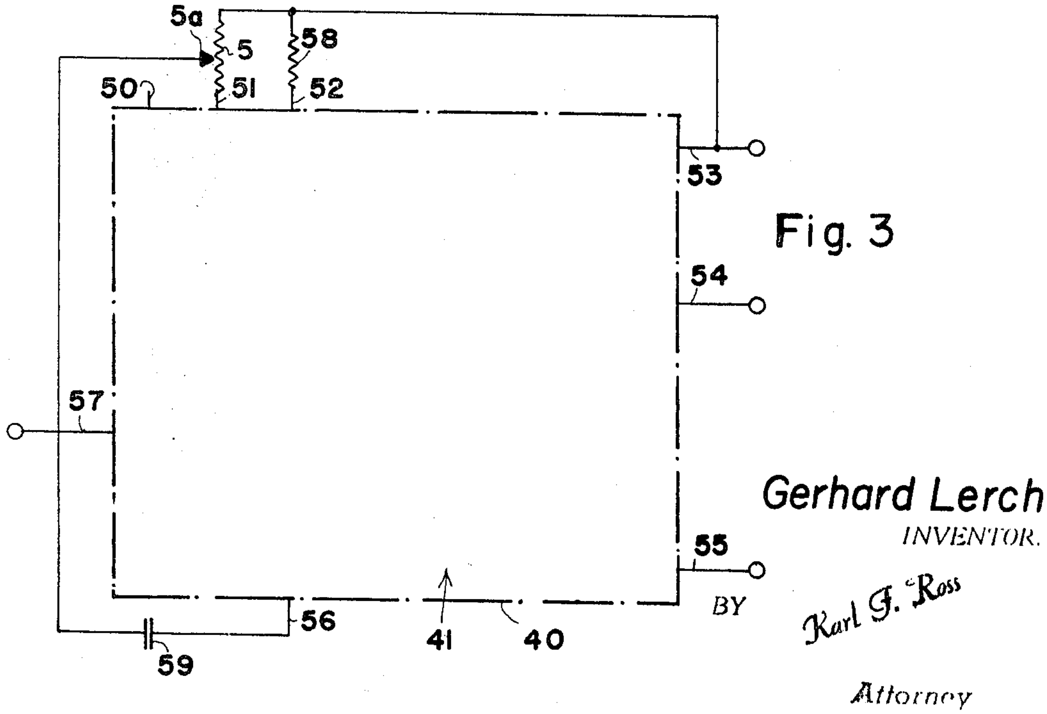
FIG. 3 is a diagram showing a modification of the circuits external of the module of FIG. 2.

FIG. 3 shows the module 41 together with a somewhat simplified external circuit wherein a fixed resistor 58, connected between leads 52 and 53, replaces the adjustable control circuit for constant-current device 20 shown in FIGS. 1 and 2. A condenser 59, connected between slider 5*a* and lead 56, takes the place of condenser 9 in FIG. 2, resistor 35 and capacitor 27 being omitted. Through suitable choice of different magnitudes for resistor 58 and condenser 59 I may obtain timing intervals ranging from 0.1 second to 10 minutes while using a module 41 of a size about equal to that of a matchbox.

I claim:

1. An electronic timer comprising a source of direct current; amplifier means connected across said source and provided with a control electrode; biasing means for normally maintaining said amplifier means in a predetermined state of conductivity, said biasing means including a resistive circuit connected across said source and a condenser connected between said control electrode and a tap on said resistive circuit normally maintained at a first potential; electronic switch means in said resistive circuit reversible by a trigger signal to drive said tap to a second potential, thereby altering the state of conductivity of said amplifier means with establishment of an unstable condition; a constant-current device in series with said condenser effective upon the driving of said tap to said second potential to charge said condenser at a fixed rate to a predetermined level terminating said unstable condition of said amplifier means; and output mean connected to said amplifier means for generating a command signal upon the termination of said unstable condition.

2. An electronic timer as defined in claim 1 wherein said electronic switch means comprises a normally blocked input transistor.

3. An electronic timer as defined in claim 2 wherein said resistive circuit comprises a potentiometer in series with said input transistor and provided with a slider constituting said tap.

4. An electronic timer as defined in claim 2 wherein said resistive circuit further comprises a fixed resistor connecting said slider to an extremity of said potentiometer, normally inoperative voltage-measuring means, and switchover means for establishing a calibrating position in which said voltage-measuring means is operatively connected in place of said fixed resistor, the magnitude of the latter equaling the internal resistance of said voltage-measuring means.

5. An electronic timer as defined in claim 4 wherein said switchover means includes circuitry for unblocking said input transistor and locking said amplifier means in said unstable condition for the duration of said calibrating position.

6. An electronic timer as defined in claim 3, further comprising capacitive means connected between said slider and a terminal of said source.

7. An electronic timer as defined in claim 2 wherein said input transistor is provided with a plurality of selectively closable trigger circuits for unblocking said input transistor.

8. An electronic timer as defined in claim 2, further comprising indicator means in series with said input transistor for signaling the conductivity thereof.

9. An electronic timer as defined in claim 1 wherein said amplifier means comprises a Schmitt trigger with first and second amplifier stages, said control electrode being part of said first stage, said second stage being provided with a biasing circuit branched off said resistive circuit for normally maintaining said second stage conductive regardless of the state of conductivity of said first stage, the latter being conductive in the presence of said first potential on said tap and being so coupled to said second stage as to render same conductive upon being cut off by the reversal of said electronic switch means, said reversal altering the voltage of said biasing circuit whereby said second stage is cut off upon restoration of conductivity in said first stage by the charge on said condenser attaining said predetermined level.

10. An electronic timer as defined in claim 9 wherein said first and second stages are a pair of emitter-coupled transistors, the first-stage transistor having an emitter-base circuit in series with said constant-current device.

11. An electronic timer as defined in claim 10 wherein said output means includes an inverting transistor coupled to the second-stage transistor of said Schmitt trigger for saturating upon cutoff of the latter transistor.

12. An electronic timer as defined in claim 10 wherein said output means comprises a further two-stage transistor amplifier having an input stage with an emitter-collector circuit connected across the output of said inverting transistor and having an output stage with an emitter-collector circuit connected across said source, said input stage having a base lead connected to a point on said resistive circuit for normally maintaining said input stage conductive with consequent cutoff of said output stage and for blocking said input stage with consequent cut-in of said output stage upon reversal of said electronic switch means, the coupling between said input and output stages rendering said output stage substantially nonconductive upon saturation of said inverting transistor.

13. An electronic timer as defined in claim 12, further comprising indicator means in series with said output stage for signaling the conductivity thereof during said unstable condition.

14. An electronic timer as defined in claim 1, further comprising a plurality of resistances of different magnitudes and selector-switch means for connecting any of said resistances in series with said constant-current device to alter the magnitude of said fixed rate.